United States Patent
Akinlar et al.

(10) Patent No.: US 7,802,008 B2
(45) Date of Patent: Sep. 21, 2010

(54) QUALITY OF SERVICE MANAGEMENT IN NETWORK GATEWAYS

(75) Inventors: Cuneyt Akinlar, Dayton, NJ (US);
Khaled Elbassioni, Alexandria (EG);
Ibrahim Kamel, Monmouth Junction, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1321 days.

(21) Appl. No.: 10/217,229

(22) Filed: Aug. 12, 2002

(65) Prior Publication Data

US 2004/0030797 A1 Feb. 12, 2004

(51) Int. Cl.
*G06F 15/16* (2006.01)

(52) U.S. Cl. ...................................... 709/235

(58) Field of Classification Search ................ 709/232, 709/223, 229, 235, 238; 370/230, 232, 280, 370/332, 354, 410, 235, 366, 231; 375/240.11; 725/97, 111
See application file for complete search history.

(56) References Cited

U.S. PATENT DOCUMENTS

| | | | | |
|---|---|---|---|---|
| 5,163,046 A | * | 11/1992 | Hahne et al. | 370/237 |
| 5,805,804 A | * | 9/1998 | Laursen et al. | 709/223 |
| 5,983,278 A | * | 11/1999 | Chong et al. | 709/235 |
| 6,009,106 A | * | 12/1999 | Rustad et al. | 370/523 |
| 6,016,311 A | * | 1/2000 | Gilbert et al. | 370/280 |
| 6,038,213 A | * | 3/2000 | Albrow et al. | 370/229 |
| 6,047,322 A | * | 4/2000 | Vaid et al. | 709/223 |
| 6,085,241 A | * | 7/2000 | Otis | 709/223 |
| 6,091,777 A | * | 7/2000 | Guetz et al. | 375/240.11 |
| 6,151,300 A | * | 11/2000 | Hunt et al. | 370/231 |
| 6,151,357 A | * | 11/2000 | Jawahar et al. | 375/228 |
| 6,230,203 B1 | * | 5/2001 | Koperda et al. | 709/229 |
| 6,252,851 B1 | * | 6/2001 | Siu et al. | 370/236 |
| 6,292,834 B1 | * | 9/2001 | Ravi et al. | 709/233 |
| 6,298,041 B1 | * | 10/2001 | Packer | 370/231 |
| 6,307,839 B1 | * | 10/2001 | Gerszberg et al. | 370/235 |
| 6,330,226 B1 | * | 12/2001 | Chapman et al. | 370/232 |
| 6,341,309 B1 | * | 1/2002 | Vaid et al. | 709/223 |

(Continued)

FOREIGN PATENT DOCUMENTS

EP 0 948 168 10/1999

(Continued)

OTHER PUBLICATIONS

Foster et al., "A Quality of Service Architecture that Combines Resource Reservation and Application Adaptation", Jun. 2000, IWQOS 200, pp. 181-188.*

(Continued)

*Primary Examiner*—Andrew Caldwell
*Assistant Examiner*—Christopher Biagini
(74) *Attorney, Agent, or Firm*—Harness, Dickey & Pierce, PLC

(57) ABSTRACT

An apparatus for ensuring quality-of-service in a network is provided. A first stream sender having a flow control parameter and transmitting a first stream. A network interconnection receiving the first stream and a second stream. First stream being a non-realtime stream and the second stream being a realtime stream. A bandwidth control being associated with the network interconnection. The bandwidth control adjusting the flow control parameter for supporting quality-of-service parameters associated with the second stream.

36 Claims, 4 Drawing Sheets

U.S. PATENT DOCUMENTS

| | | | | |
|---|---|---|---|---|
| 6,438,101 | B1* | 8/2002 | Kalampoukas et al. | 370/229 |
| 6,438,105 | B1* | 8/2002 | Qarni et al. | 370/231 |
| 6,477,707 | B1* | 11/2002 | King et al. | 725/97 |
| 6,505,244 | B1* | 1/2003 | Natarajan et al. | 709/223 |
| 6,529,477 | B1* | 3/2003 | Toporek et al. | 370/235 |
| 6,553,568 | B1* | 4/2003 | Fijolek et al. | 725/111 |
| 6,560,243 | B1* | 5/2003 | Mogul | 370/468 |
| 6,600,737 | B1* | 7/2003 | Lai et al. | 370/352 |
| 6,611,503 | B1* | 8/2003 | Fitzgerald et al. | 370/260 |
| 6,631,122 | B1* | 10/2003 | Arunachalam et al. | 370/332 |
| 6,667,972 | B1* | 12/2003 | Foltan et al. | 370/354 |
| 6,687,228 | B1* | 2/2004 | Fichou et al. | 370/232 |
| 6,738,348 | B1* | 5/2004 | Rollins | 370/230 |
| 6,741,563 | B2* | 5/2004 | Packer | 370/231 |
| 6,745,246 | B1* | 6/2004 | Erimli et al. | 709/238 |
| 6,754,228 | B1* | 6/2004 | Ludwig | 370/468 |
| 6,771,599 | B1* | 8/2004 | Aoyama et al. | 370/230 |
| 6,820,117 | B1* | 11/2004 | Johnson | 709/223 |
| 6,850,488 | B1* | 2/2005 | Wesley et al. | 370/230 |
| 6,859,454 | B1* | 2/2005 | Bowes | 370/366 |
| 6,870,811 | B2* | 3/2005 | Barker et al. | 370/235 |
| 6,870,812 | B1* | 3/2005 | Kloth et al. | 370/235 |
| 6,876,668 | B1* | 4/2005 | Chawla et al. | 370/468 |
| 6,880,017 | B1* | 4/2005 | Marce et al. | 709/232 |
| 6,909,691 | B1* | 6/2005 | Goyal et al. | 370/230 |
| 6,928,052 | B2* | 8/2005 | Packer | 370/231 |
| 6,944,169 | B1* | 9/2005 | Yoshizawa et al. | 370/410 |
| 7,099,273 | B2* | 8/2006 | Ha et al. | 370/229 |
| 7,099,954 | B2* | 8/2006 | Li et al. | 709/233 |
| 7,116,682 | B1* | 10/2006 | Waclawsky et al. | 370/468 |
| 7,190,670 | B2* | 3/2007 | Varsa et al. | 370/229 |
| 7,266,613 | B1* | 9/2007 | Brown et al. | 709/235 |
| 2001/0023453 | A1* | 9/2001 | Sundqvist | 709/232 |
| 2002/0031088 | A1* | 3/2002 | Packer | 370/231 |
| 2002/0150048 | A1* | 10/2002 | Ha et al. | 370/231 |

FOREIGN PATENT DOCUMENTS

| | | |
|---|---|---|
| WO | WO 99/62259 | 12/1999 |

OTHER PUBLICATIONS

Shin et al., "Quality-of-Service Mapping Mechanism for Packet Video in Differentiated Services Network", Jun. 2001, IEEE Transactions On Multimedia, vol. 3, No. 2, pp. 219-231.*

Mirhakkak et al., "Dynamic Bandwidth Management and Adaptive Applications for a Variable Bandwidth Wireless Environment", Oct. 2001, IEEE, vol. 19, No. 10, pp. 1984-1997.*

Hasegawa et al.,"Receiver-Based Management Scheme Of Access Link Resources For QoS -Controllable TCP Connections", Graduate School of Information Science and Technology, Osaka University, 4 pages.*

Chesterfiled et al., "Exploiting Diversity To Enhance Multimedia Streaming Over Cellular Links", University of Cambridge, U.K., 12 pages.*

Electronic Letters, "Start-Up transition behavior of TCP NewReno", Electronic Letters, Oct. 14, 1999, vol. 35, No. 21, pp. 1818-1820.*

Spring et al., "Receiver Based Management of Low Bandwidth Access Links", IEEE INFOCOM 2000, 9 pages.*

Na et al., "TCP-like Flow Control Algorithm for Real-time Application", IEEE 2000, pp. 99-104.*

Feng et al., "The Adverse Impact of the TCP Congestion-Control Mechanism in Heterogenous Computing Systems", Dept. of Electrical & Computer Engineering University of Wisconsin-Madison, ICPP 2000, 8 pages.*

Aweya et al., "TCP rate control with dynamic buffer sharing", Nortel Network, Computer Communications, Oct. 16, 2001, pp. 922-943.*

Mascolo et al., "TCP Westwood: Bandwidth Estimation for Enhanced Transport OVer Wireless Links", 2001 ACM SIGMOBILE, pp. 287-297.*

Heffner John, "High Bandwith TCP Queuing", Jul. 24, 2002, 17 pages.*

Search Report from European Patent Office for PCT/US2003/023513.

* cited by examiner

QUALITY OF SERVICE MANAGEMENT IN NETWORK GATEWAYS

FIELD OF THE INVENTION

The present invention relates to ensuring quality-of-service in networks, and in particular to ensuring quality-of-service for networks transmitting and receiving realtime and non-realtime data-streams.

BACKGROUND OF THE INVENTION

Network users are able to access various types of information from the Internet and other sources. The type of information that the network users can access can be broadly divided into two categories: realtime streams and non-realtime streams. For example, a typical user will be receiving realtime data streams of video or audio and non-realtime data streams like e-mail, web pages, or File-Transfer Protocol (FTP) downloads. Realtime data-streams are generally required to be transmitted or processed within some small upper limit of time. Non-realtime data-streams are broadly understood to be not requiring processing or transmission within the time constraints such as those required for the realtime data-streams. Realtime and non-realtime data-streams have differing characteristics as described next.

The chief characteristics of realtime and non-realtime data-streams of relevance here are their respective bandwidth requirements for providing different levels of Quality-of-service (QoS). QoS is broadly understood as the set of performance properties of given a network service, generally including throughput, transit, delay and priority. In the present context of realtime streams, the additional QoS parameters include bandwidth availability, delay and jitter among other parameters. Those skilled in the art will appreciate that relevancy and importance of any given QoS parameters will depend upon the nature of the realtime data stream used in a particular application. The invention covers and supports any set of QoS parameters for a given realtime data stream. Realtime streams need a guaranteed QoS for providing relatively fast and time constrained information transmission. Non-realtime streams are generally transmitted using the transmission control protocol (TCP)/Internet Protocol (IP). Contrastingly, non-realtime streams do not generally require the QoS similar to that required for the realtime streams. A typical example of a network handling realtime and non-realtime data-streams is described next.

A network can be configured to receive both realtime and non-realtime data-streams from an external source. A single transmission channel generally links the user's network to the Internet service provider (ISP). The same transmission channel concurrently carries both the realtime and non-realtime streams. The bandwidth capacity of such a transmission channel generally remains fixed. Therefore, it becomes necessary to balance the allocation of available bandwidth between the conflicting demands made by the realtime and non-realtime streams. The problem of bandwidth allocation is illustrated next in the context of a typical user.

A network user is usually connected to a network like Internet through a service provider who may provide Internet-access and possibly other services like video-on-demand, IP telephony, streaming audio and video. The service provider is linked to the network user by a transmission channel like a dial-up telephone line, xDSL, ISDN, etc. The connecting device at the service provider's end may be an edge router, and at the network user end it would generally be a gateway.

Realtime data-streams require an almost fixed allocation of bandwidth. Realtime data-streams offer little flexibility in adjusting bandwidth requirements without compromising the QoS parameters. In contrast, the non-realtime data-streams are relatively flexible about their bandwidth demands, because they do not usually require a relatively strict QoS. Bandwidth availability may change over a given period of time. Therefore, the non-realtime stream traffic from the service provider to the network user needs to be controlled in order to ensure that the realtime streams get the required bandwidth for maintaining its QoS. Possible methods for controlling the sharing of bandwidths are considered next.

A conventional approach using a packet pacing method is discussed next. Non-realtime traffic transmitted from the router located at the service provider to the gateway will generally be the Internet communication traffic transmitted using the TCP protocol. The TCP sender at the Internet site controls the non-realtime traffic by pacing the non-realtime packets to ensure that the realtime traffic gets the required bandwidth. The packet pacing method and its associated problems are described next.

Packet pacing is generally performed by controlling the rate of packet transmission. Implementing such packet pacing method requires significant changes in the operations of a TCP sender. In a typical network user scenario the TCP sender, i.e., a HTTP server, is under control of an external agency like a university, hospital, or company. The ISP may not be expected to employ any particular bandwidth management techniques. An ISP typically will be servicing a large number of users in a situation where each one of the users has several active TCP connections operating at the same time. Such packet pacing approach is not feasible to implement at an ISP site due to scalability problems associated with supporting a large number of users. Thus, there is a need for an improved bandwidth management technique that is implemented at the gateway side of the network.

Another approach involves controlling the TCP traffic for the non-realtime streams from a conventional user gateway. The difficulty with this approach is that the TCP-receiver at the user gateway has almost no operatively effective control over the TCP-sender, which is typically a Hypertext Transfer Protocol (HTTP) server or a FTP server. Hence, there is a need for an apparatus and method that allows controlling the non-real time traffic at the gateway end, and which is feasible in a TCP environment without using any special apparatus at the user end.

Above described known methods for bandwidth management in networks where realtime and non-realtime traffic share the available bandwidth of a channel have several drawbacks as described above. Thus, there is a need for a bandwidth management solution that allows controlling the non-realtime streams bandwidth demands so that the realtime streams can provide a desired QoS. Further, there is a need for implementing such a solution on the gateway located at the user's end of the network.

SUMMARY OF THE INVENTION

A system for ensuring quality of service in a network is disclosed. The network uses a single communication channel sharing realtime and non-realtime transmissions, e.g. TCP traffic, that is connected to a gateway. The non-realtime streams are transmitted using non-realtime senders that have flow control parameters or windows. The gateway is further connected to a network including various network elements. The gateway includes a bandwidth control unit that controls the bandwidth demands of the non-realtime transmissions by adjusting the flow control parameter on the non-realtime senders. The realtime streams require consistent bandwidth to support quality of service parameters like delay and jitter. The bandwidth control regulates the non-realtime connections bandwidth requirement, and hence ensures the bandwidth required by realtime streams. The bandwidth control can also dynamically allocate bandwidth between multiple non-realtime TCP connections, so that the unused bandwidth available during a TCP slow-start of a given TCP connection can be allocated to other steady state TCP connection.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
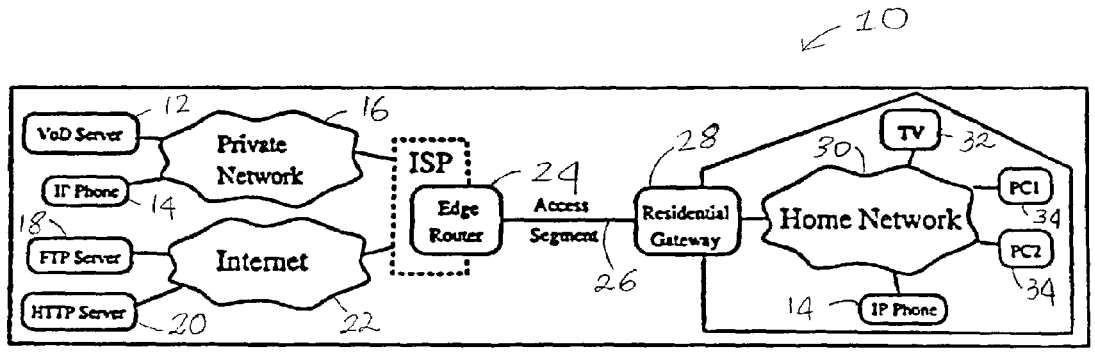
FIG. 1 shows a network configuration for illustrating the invention's implementation of bandwidth management.

FIG. 1 shows a network configuration 10 for illustrating bandwidth management. Bandwidth management mechanism employing the principle of the invention will be illustrated using the exemplary network configuration 10. Hence, the network configuration 10 is described next in detail. The constituent elements of the network configuration 10 are described next. A VoD server 12 and an Internet Protocol (IP) phone 14 are connected to a private network 16. The VoD server 12 provides video-on-demand transmissions and the IP phone 14 provides phone-like communication service using the IP protocol to the network user. A FTP server 18 and a HTTP server 20 are connected to an Internet server 22. Typically, the VoD server 12 and the IP phone 14 transmit in a realtime manner with strict time constraints. In contrast, the FTP server 18 and the HTTP server 20 transmit information in a non-realtime manner with relatively stringent time constraints. Those skilled in the art will appreciate that the following description of the network is only an illustration and that invention covers any suitable type of network configuration.

Internet server 22 and the private network 16 are both connected to an ISP edge router 24. An access segment 26 connects the edge router 24 to a gateway 28. Access segment 26 is a communication channel for transmitting and receiving data to and from said ISP edge router 24 and the gateway 28. Access segment 26 is generally a broadband connection like xDSL, ISDN or coaxial cable, but it can also be a dial-up telephone connection. Access, segment 26 simultaneously carries both realtime and non-realtime streams transmitted via the edge router 24. Streams are logical channels of dataflow. Realtime streams carry realtime data for applications like video-on demand. Non realtime streams in the present context are generally TCP or similar logical communication exchange using an appropriate protocol. Those skilled in the art will appreciate that the term "streams" in used in a generally broad manner to indicate a sequence of data or information.

Realtime streams share the bandwidth of the same access segment 26 with the non-realtime TCP traffic, and hence bandwidth management methods or algorithms are required to apportion the available bandwidth between realtime and non-realtime streams. Such a bandwidth management method or algorithm should limit the incoming TCP traffic in such a manner that sufficient bandwidth out of the aggregate bandwidth is left for the realtime streams that have strict QoS requirements. Preferable characteristics of the edge router 24 are described next.

Edge router 24 is a connection point for the network user communicating with the service provider. Edge router 24 can be any general purpose device generally having the capability to forward packets from the Internet hosts to the gateway 28. Edge router 24 must be able to transmit and receive IP packets between the gateway 28 and the Internet server 22. Hence, any router providing such service can be used here as the edge router 24. Edge router 28 may have other capabilities, e.g. ability to multiplex Internet and other traffic, but additional capabilities are not relevant for the present invention. The only capability that is relevant here is the ability to transmit and receive IP packets from the Internet hosts to the gateway 28. Next, the features of the data-streams carried over the access segment 26 are described.

The realtime media streams may be transmitted as IP or non-IP traffic. One of the characteristics of the realtime streams that is considered relevant here is that they are packetized, i.e., sent in packets, and have stringent time constraints, and any packet delays are detrimental to their performance characteristics. Realtime streams carried over the access segment 26 have strict QoS requirements such as sufficient bandwidth, minimal delay and minimal or no jitter. The media streams from the VoD server 12 and the IP phone 14 are merely examples of any realtime streams, and the invention is not limited by the number or types of realtime streams of information. The modalities of transmitting realtime streams are not considered here as they may vary across configurations. The principle of the invention encompasses any type of realtime transmission having certain definite bandwidth requirements necessary to ensure a given set of QoS parameters. The preferable network location for implementing the bandwidth management method is the gateway 28. Preferable characteristics of the gateway 28 are described next.

Gateway 28 connects the access segment 26 and the network 30. Network 30 may be constructed by using multiple networking technologies, for example, IEEE 1394, Ethernet, 802.11 wireless LAN, and powerline networks. Gateway 28 can be a conventional gateway or a router installed as a separate unit. The gateway 28 is an interconnection point in the network for connecting the network 30 to the edge router 24. The gateway 28 can also be integrated in an appliance such as digital television or a set-top-box. The function of the gateway 28 is to provide a point of connection between the Internet connection on its one interface and the network 30 connected components on its other interface. Gateway 28 serves as a connection point for a network 30 to the edge router 24. The network 30 and associated network elements are described next.

A range of network elements can be connected to the gateway 28 through the network 30. Various devices like television 32, computers 34 and IP phones 14 can be connected to the network 30. Those skilled in the art will appreciate that the network elements shown here are used only to illustrate the type of devices that can be connected to the network 30. Above listed devices or appliances are merely illustrations and many other devices can also be connected to the network 30.

Figure 2:
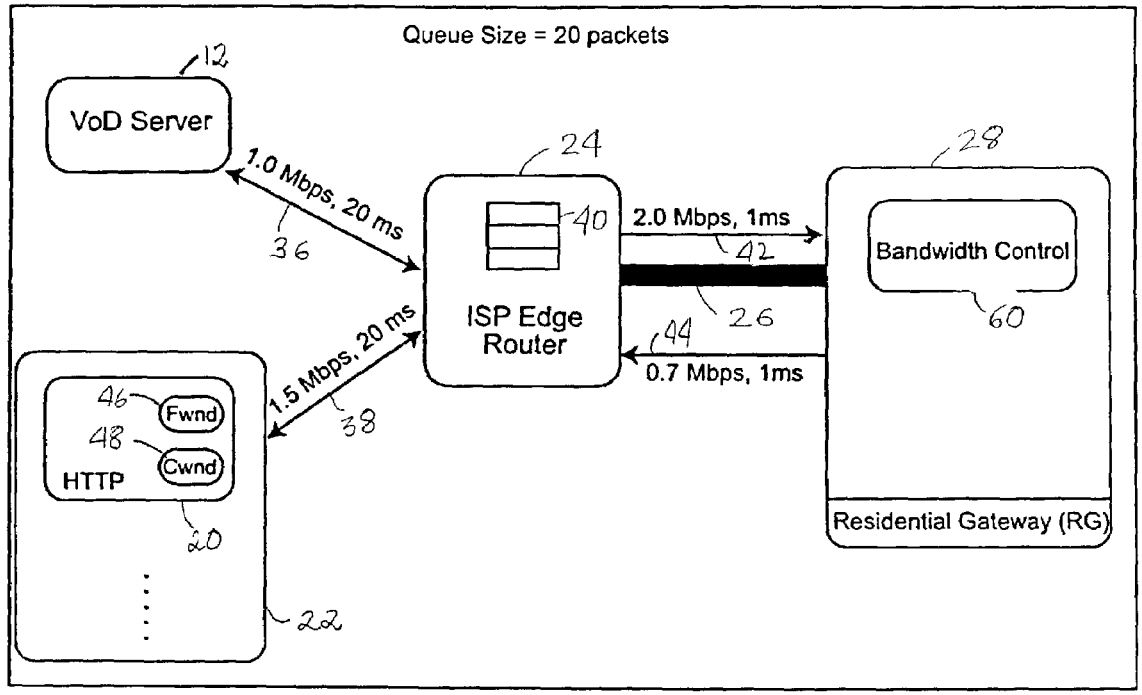
FIG. 2 shows an exemplary network configuration having a single TCP sender and implementing the invention's bandwidth management.

FIG. 2 shows an exemplary network configuration having a single TCP sender and implementing bandwidth management. The invention can be better understood by those in skilled in the art from a comparison between a network with bandwidth management and a network without bandwidth management. Bandwidth management for a network having a single TCP sender is described in two steps. In the first step, the performance of the network is simulated and analyzed while assuming that no bandwidth management is performed. Such a simulation provides a background for making a comparison between the network without and with bandwidth management. In the second step, the same network is simulated and analyzed, but with a bandwidth control being used to implement the invention's principle for a single TCP sender network. Therefore, first the network shown in FIG. 2 is simulated and analyzed assuming that there is no bandwidth control as described below.

The following description establishes the need for bandwidth control. An assumption is made that the bandwidth control shown in the FIG. 2 does not exist in order to provide a comparison further-on in the description below. The network described here is used to simulate the performance characteristics of a typical network that does not use any bandwidth management. VoD server 12, HTTP server 20, Internet server 22, edge router 24 and the gateway 28 are interconnected as described in the context of FIG. 1.

In the present network the access segment 26 is a dedicated asymmetric link, for example, an ADSL link, with a downstream bandwidth of 2.0 Mbps and an upstream bandwidth of 0.7 Mbps. The delay in context of the access segment 26 is a negligible 1 ms, since typically the edge router 24 and the gateway 28 would be relatively close to each other.

VoD server 12 is connected to the edge router 24 by a full-duplex VoD link 36 having a 20 ms delay. VoD server 12 transmits video signal having a constant bit rate (CBR) in a realtime manner at the rate of 1.0 Mbps. The HTTP server 20 is configured as a constituent part of the Internet server 22 (as shown) or it may be externally connected (as shown in FIG. 1) to the Internet server 22. The HTTP server 20 transmits non-realtime data packets over a full duplex HTTP link 38 having 1.5 Mbps bandwidth and a 20 ms delay.

Edge router 24 includes a first-in-first-out (FIFO) queue 40 having a capacity to hold 20 packets. Realtime stream from the VoD server 12 requires 1 Mbps bandwidth from the aggregate 2 Mbps downward capacity 42 of the access segment 26. As a result, the HTTP server 20 can transmit packet traffic that uses up to 1.0 Mbps maximum capacity for non-realtime traffic directed toward the gateway 28.

Figure 3:
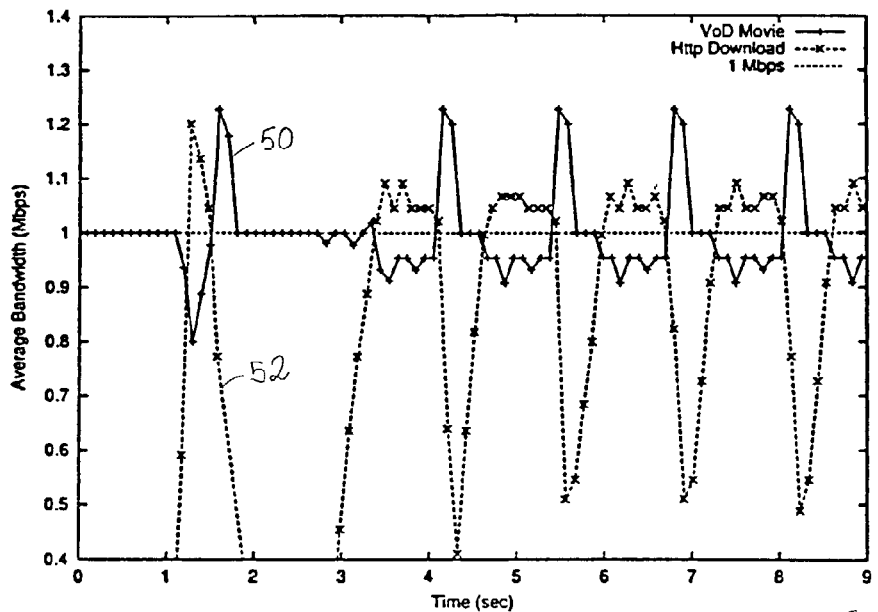
FIG. 3 is a graph showing the average bandwidth for the realtime and non-realtime streams in the absence of any bandwidth management.
Figure 4:
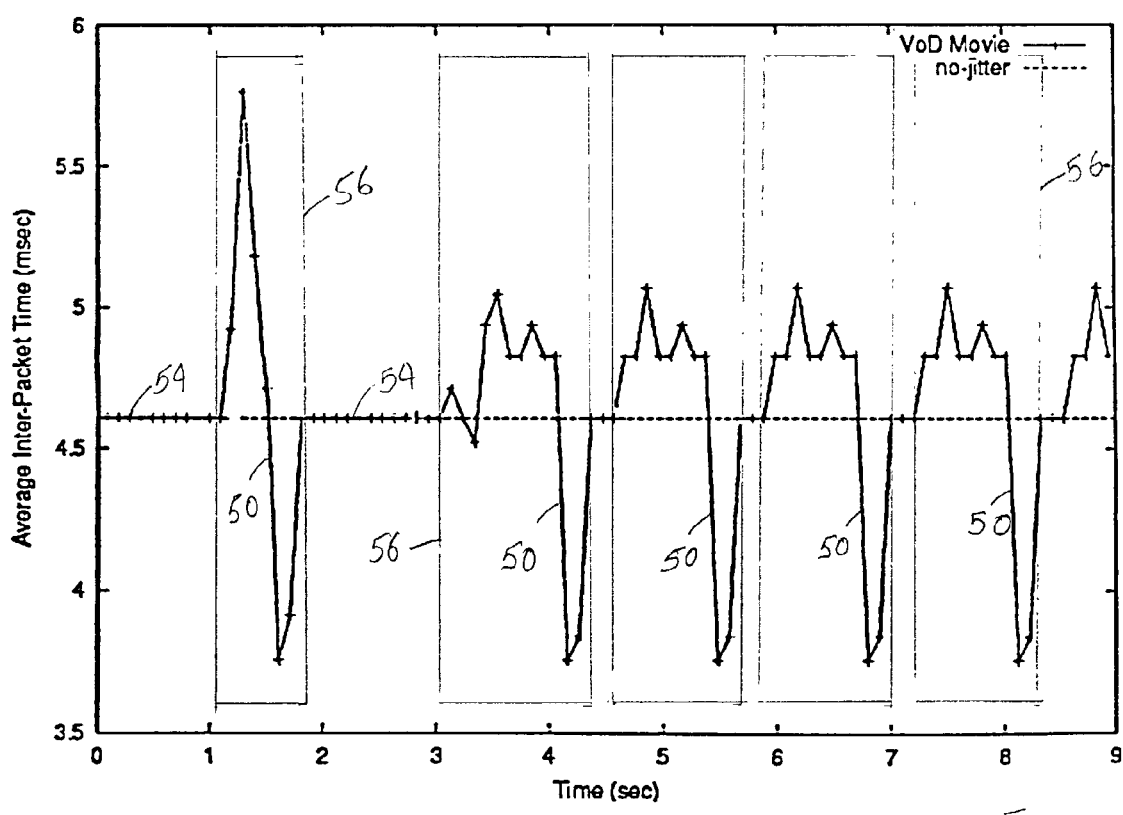
FIG. 4 shows the average inter-packet time for the VoD stream.

FIGS. 3 and 4 deal with a network simulation for a network using no bandwidth control for management bandwidth requirements of non-realtime streams. First, some foundational information about the simulation technique is described below.

A network simulator is used to perform simulations for comparing performance with and without bandwidth management. Any conventional network simulator capable of performing simulation as described next may be used. For example, the 'ns UCB/LBNL/VINT' network simulator can be used. The VoD Stream is modeled by a CBR source sending data using the user datagram protocol (UDP) with a packet size of 576 bytes. A TCP connection for non-realtime data is modeled using a TCP/Reno source at the HTTP server 20 and a TCP sink at the gateway 28. The maximum segment size is set to 576 bytes, and the size of an initial flow control window 46 is set to 32 packets. The TCP flow control window 46 sizes are 16 KB or 32 KB for most operating systems. Hence, the HTTP server 20 always sends TCP packets of size 576 bytes, and does not have more than 64 unacknowledged TCP segments in transit. In the present context the TCP sender in the description below would mean the HTTP server 20, which transmits the HTTP download 52 to the gateway 28. Following the foundational information for network simulation, the specific simulations are described below in context of the appropriate figures.

FIG. 3 is a graph showing the average bandwidth for the realtime and non-realtime streams in the absence of any bandwidth management. Time measured in seconds is plotted on the X-axis of the graph, and average bandwidth measured in Mbps is plotted on the Y-axis. The average bandwidth is calculated at the gateway 28 over a period of 0.1 seconds. The graph clearly shows that the VoD stream 50 is not able to receive a consistent bandwidth of 1 Mbps, which is bandwidth required for the realtime VoD stream 50 to satisfy the QoS parameters like delay and jitter.

Further, the HTTP download 52 also shows chaotic behavior due to packet drops at the edge router 24 (see FIG. 2). Whenever the HTTP server 20 (see FIG. 2) starts pumping the HTTP download 52 requiring more than 1 Mbps bandwidth, the edge router 24 starts dropping packets from both the realtime and non-realtime streams. This problem occurs at 1.40 seconds, at 3.5 seconds and then repeats itself periodically.

Just as the HTTP download 52 starts losing packets at 1.40 seconds, the TCP congestion window 48 (see FIG. 2) gets smaller to adjust for the congestion. This causes the HTTP server 20 to reduce its rate of packet transmission. Such a rate reduction for the HTTP download 52 is a positive factor for the VoD stream 52, but the access segment 26 bandwidth remains under-utilized since the reduced HTTP download 52 leaves some bandwidth unused. The under-utilization of bandwidth due to reduced HTTP download 52 continues till the TCP sender recovers its lost packets and increases its transmission rate. Once the TCP sender fully recovers and starts transmitting above 1 Mbps limit at around 3.5 seconds the edge router 24 again drops packets from both streams causing the same behavior that occurred at occurred at 1.4 seconds as described above and this cycle continues till the end of simulation.

FIG. 4 shows the average inter-packet time for the VoD stream 50. Time measured in seconds is plotted on the X-axis of the graph, and average inter-packet time measured in Mbps is plotted on the Y-axis.

Jitter is an undesirable characteristic in a realtime transmission. The average inter-packet time is a good indicator of jitter. Variable inter-packet time leads to more jitter. As soon as the HTTP server 20 starts pumping HTTP download 52 (see FIG. 3) above the 1 Mbps level, the VoD stream 52 (see FIG. 3) packets are delayed in the FIFO queue 40 (see FIG. 2), and thus causing the inter-packet time to increase. Later when the HTTP server 20 detects the packet drops and reduces its rate of packet transmission, the packets that have been queued in the FIFO queue 40 are transmitted in quick succession leading to decrease in the inter-packet time. Both of these cases of increase or decrease in the inter-packet time are undesirable and either cause underflow or overflow at the other end on the gateway 28. Ideally, the inter-packet time should remain constant at the level shown by the no-jitter line 54. The sections where jitter occurs during the transmission and causes problems is shown by jitter-regions 56. In the second step as referred to above, the full network as shown in FIG. 2 is now discussed below including bandwidth management for a single TCP sender network using the principle of the invention.

A network configuration that uses realtime and non-realtime transmission over a single transmission channel faces bandwidth allocation problems as described above. The description below is in the context of a single transmission channel, but those skilled in the art will appreciate that the invention can operate over multiple transmission channels also.

Bandwidth management is required to adhere to the QoS requirements of realtime streams. Bandwidth management also improves the overall channel utilization of the access segment 26 and the throughput of the non-realtime network traffic. Bandwidth management ensures the QoS criteria for realtime streams. Bandwidth management requires a choice to be made of a location in the network for implementing the bandwidth control methods. Gateway 28 is the present invention's preferred location in the network for implementing bandwidth control.

The bandwidth management technique of the present invention for a single TCP sender will be described next while referring back to the FIG. 2. In a typical network setting, a TCP sender like the HTTP sever 20 would not know in advance the available bandwidth in the path of its transmission to a TCP receiver. The TCP receiver like the gateway 28 of the present embodiment would have that knowledge of available path bandwidth. Here, the gateway 28 knows in advance that the TCP traffic should not exceed 1 Mbps, because the realtime traffic needs an assured bandwidth of 1 Mbps from the overall access segment 26's downward capacity of 2.0 Mbps.

The gateway 28 uses its knowledge of bandwidth requirements of the realtime and non-realtime streams to control the non-realtime, i.e., TCP traffic, coming from the HTTP server 20 SO that the TCP traffic does not exceed the bandwidth available for non-realtime streams. Hence, the realtime streams are able to satisfy the required QoS criteria.

The bandwidth control 60 makes it possible to ensure the QoS requirements for the realtime streams are satisfied by controlling the data flow from the gateway 28 end. The bandwidth control 60 can be implemented in hardware, as a software module or as a combination of hardware and software. Controlling the flow of non-realtime traffic from the gateway 28 end eliminates the possible scalability problems associated with the solutions that control traffic from the edge router 24 at the Internet service provider side.

If a bandwidth management solution is employed at the edge router 24 end then a separate protocol is required to coordinate the bandwidth negotiation process between the gateway 28 and the edge router 24 for each realtime and non-realtime traffic stream. Implementing the bandwidth control 60 not the gateway eliminates this coordination problem. The details of how the bandwidth is managed from the gateway 28 are described next.

The description next refers to a single TCP connection, and then later-on multiple TCP connections are considered. A TCP sender, i.e. here the HTTP server 20, sends 'wnd' number of packets to the TCP receiver, i.e., here the gateway 28, within each round trip time ("rtt") segment. The 'wnd' number of packets to be sent in each rtt segment is calculated as wnd=min {cwnd, fwnd}, which is the active window size. The TCP sender always maintains two variables or parameters called "cwnd" and "fwnd". The cwnd parameter represents a congestion control window and is computed by the TCP sender based upon the received acknowledgement and packet drops. The cwnd parameter is strictly controlled by the TCP sender. The fwnd parameter represents the flow control window and is set by the TCP receiver.

The data rate ("b") for a TCP connection within a rtt segment is given by $$b = \frac{wnd}{rtt}.$$

Considering the slow start phase in a given TCP connection, if the connection starts at time $t^0$ as measured by the sender's clock, the sender will transmit packets, at any time $t > t^0$ assuming no packet drops and given by:

$$f(t) = \min\{fwnd(t), g(t)\}, \text{ where}$$

$$g(t) \underline{def} 2^{\left[\frac{t-t^0}{rtt}\right]}. \quad \text{[Equation no. 1]}$$

If packet drops are taken into consideration then more complex throughput formulas can be derived by known methods.

A "steady state" connection is one for which the number of packets transmitted is completely determined by the fwnd parameter. For a given connection to be in the steady state, value of the cwnd must be greater than the value of the fwnd parameter. In the steady state the TCP sender's output can be completely controlled by the TCP receiver and is shown by the above equation no. 1.

Gateway 28 controls the non-realtime traffic by manipulating the size of the flow control window $fwnd_i$, which is located within the TCP sender at the other end. In the present illustration the non-realtime traffic, i.e., TCP traffic, should not exceed the 1 Mbps limit. If the maximum TCP segment size is 576 bytes, and the round trip time between the gateway 28 and the HTTP server 20 is 47 ms, which is obtained through simulation, then the gateway 28 sets the flow control window size, i.e., the value of the $fwnd_i$ to $$\frac{1 \text{ Mbps} * 47 \text{ ms}}{576 * 8 \text{ bits}} = 10 \text{ packets.}$$

Setting the value of $fwnd_i$ to 10 packets ensures that regardless of the congestion window size, the maximum data rate of the TCP connection can never exceed 1 Mbps.

Figure 5:
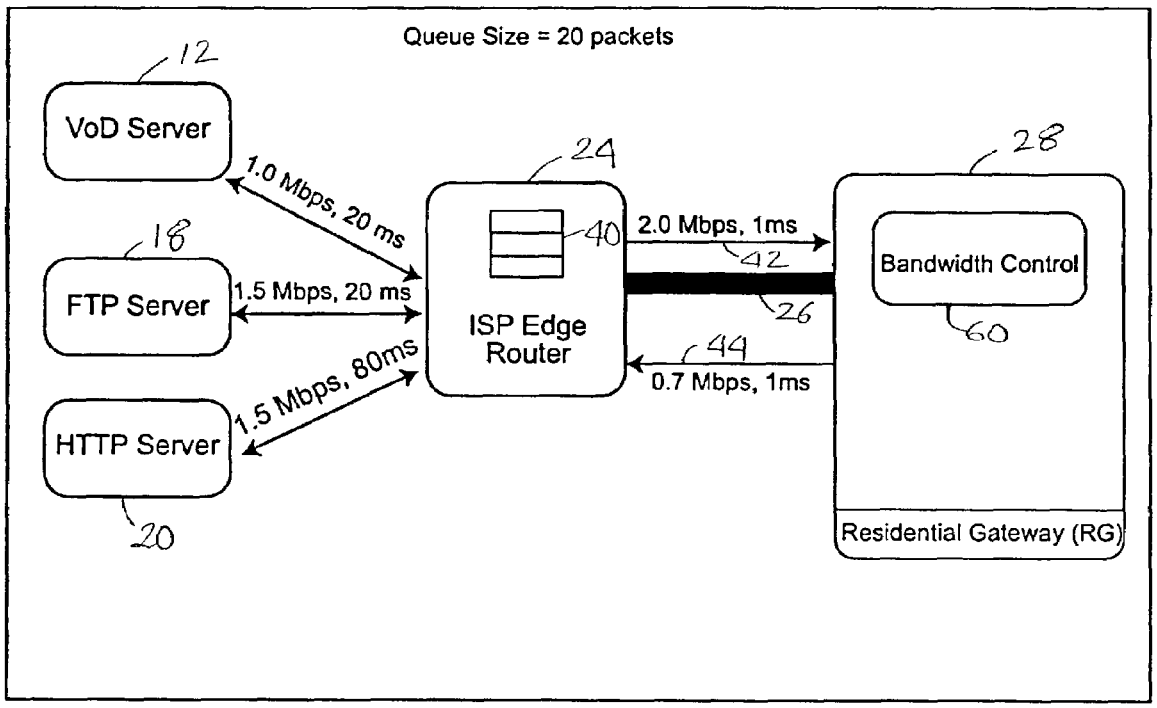
FIG. 5 shows network configuration having multiple TCP connections and implementing bandwidth management.

FIG. 5 shows a network configuration having multiple TCP connections and implementing bandwidth management. The configuration of the network shown is conceptually and structurally similar to that described in context of the FIG. 2 above.

The network in FIG. 5 includes an additional TCP sender in the form of the FTP server 18 that transmits information requiring 1.5 Mbps bandwidth and has a delay of 20 ms. The bandwidth control 60 is used to manipulate the flow control from the gateway 28.

Figure 6:
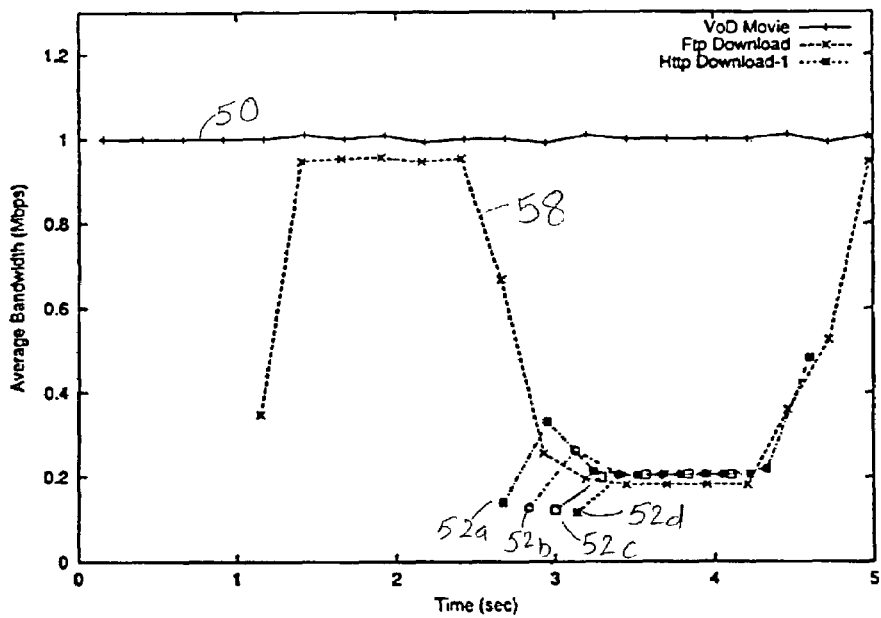
FIG. 6 is a graph showing the average bandwidth of each stream and the aggregate bandwidth of all streams.

FIG. 6 shows the average bandwidth of each stream along with the aggregate bandwidth of all streams, i.e., realtime and non-realtime combined. At time 0, the VoD server 12 starts pumping realtime CBR video at the rate of 1 Mbps. At time 1 second, a network user starts a FTP download from the FTP server 18. At around 3 seconds the network user starts a webpage download from the HTTP server 20. It is assumed that the webpage to be downloaded has multiple items like images and audio-clips to be downloaded as parts of the webpage. The web-browser (not shown) starts four simultaneous TCP connections, i.e., HTTP downloads $52_a$, $52_b$, $52_c$, $52_d$, to download the webpage and the associated multiple items. The four HTTP downloads $52_a$, $52_b$, $52_c$, $52_d$ finish around 4.5 seconds, and the simulation is terminated at 5 seconds.

VoD stream 50 clearly achieves a sustained 1 Mbps regardless of the number of active TCP connections. The bandwidth control 60 reduces the data rate for the FTP download 58 when the HTTP downloads 52 start around 2 seconds. Bandwidth control 60's reduction of the data rate ensures that the aggregate non-realtime traffic never exceeds the available 1 Mbps bandwidth for the non-real time traffic. Bandwidth control 60 adjusts the individual non-realtime data connections so that the realtime streams receive the guaranteed bandwidth sufficient to service its QoS requirements. Thus, the bandwidth control 60 adjusts the aggregate non-realtime bandwidth by manipulating the individual flow control windows on the several TCP senders.

Bandwidth management technique using the principle of the present invention for multiple TCP connections is described next. To illustrate a set N of n non-realtime connections is considered. Each non-realtime connection is typically a HTTP or FTP connection. Let $rtt_i$ be the estimate of the round-trip time of a given connection i. The $rtt_i$ is calculated as described next.

Gateway 28 makes an initial estimate of the time required to get an acknowledgement at the time of setting up the connection. Let R be the set of realtime streams and $B_i$ be the bandwidth required by a given realtime stream $i \in R$, where the streams in R require constant bit rate. The above described parameters n, i, $rtt_i$, B and the sets N and R are assumed to be functions of time and will be denoted as such, if necessary.

The goal is to maximize the throughput $$b_i = \frac{wnd_i}{rtt_i}$$

for each connection, since the TCP sender i sends $wnd_i$=min $\{cwnd_i, fwnd_i\}$. The throughput maximization is subject to the inequality given below:

$$\sum_{i \in N} \frac{wnd_i}{rtt_i} \leq B \quad \text{[Equation no. 2]}$$

where, $$B = B_c - \sum_{i \in R} B_i$$

and where $B_c$ is the total capacity of the access segment 26.

If the connections are all identically important, then the steady state flow control window size for each i, subject to the equation no. 2 is given by the conservative bound as given by the equation below:

$$fwnd_i = \frac{B \times rtt_i}{n}$$

A static scheduling point is defined as a point in time at which either a new connection is established or an existing connection is terminated.

Figure 7:
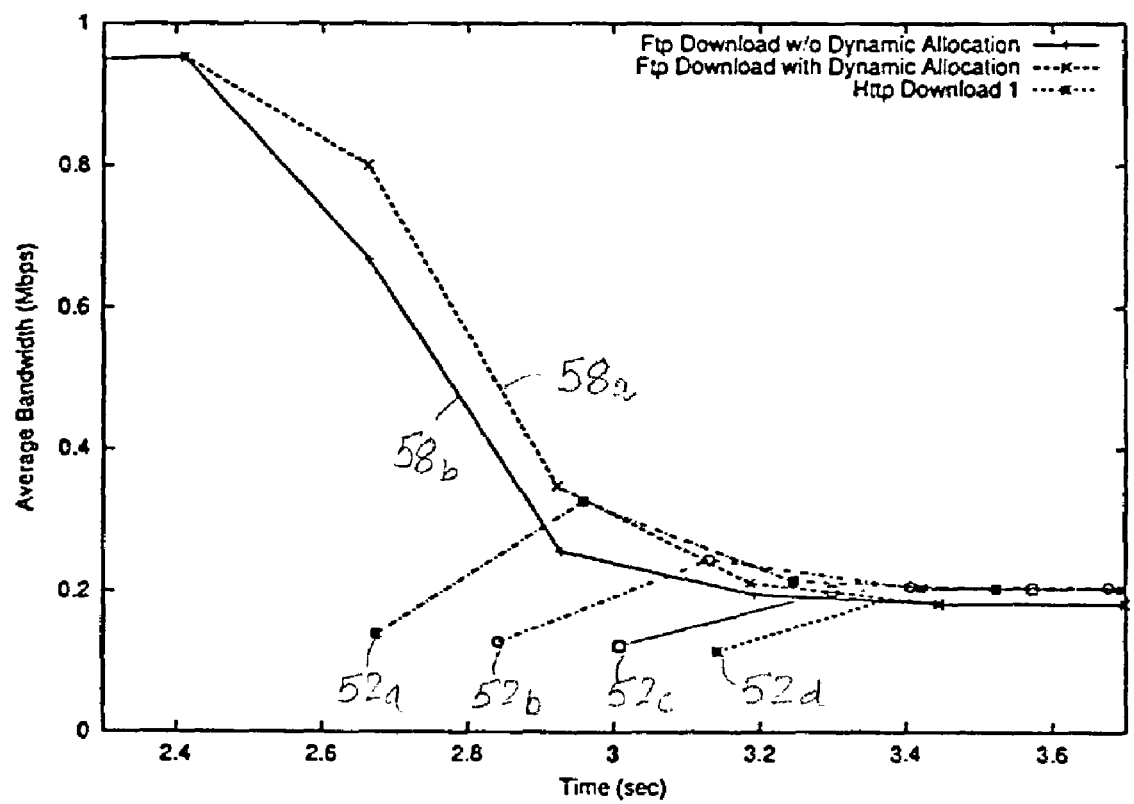
FIG. 7 is a graph showing performance characteristics of dynamic bandwidth management.

The static bandwidth allocation procedure or algorithm is as shown below:

for each static scheduling point t do the following
   if the operation is a non-realtime connection-add then
     set n←n+1
   else if the operation is a non-realtime connection-drop then
     set n←n−1
   else//realtime add or drop
     re-calculate B as given by $$B = B_c - \sum_{i \in R} B_i$$

endif
   for i=1 to n
     set $fwnd_i$ ←

$$\frac{B \times rtt_i}{n}$$

set the flow-control window to $fwnd_i$ in the first acknowledgement sent to the sender of the connection i
   endfor
endfor
//END FIG. 7 is a graph showing performance characteristics of dynamic bandwidth management. The algorithm described in paragraph [0046] (hereafter called "the algorithm") can be further improved as described next. The algorithm works in a static manner and limits the aggregate non-realtime TCP traffic bandwidth for ensuring QoS guarantees for the realtime traffic. The algorithm is invariant with respect to the number of non-realtime connections. Further improvements to performance of the non-realtime connections and to the total channel utilization are possible by using dynamic rather than static bandwidth allocation. Dynamic bandwidth allocation techniques of the present invention are described next with an illustration.

To illustrate the improvement, the following table is used as an example:

| Period | 1 | 2 | 3 | 4 | 5 | ... |
|---|---|---|---|---|---|---|
| TCP-1 fwnd with static bw allocation | 16 | 8 | 8 | 8 | 8 | ... |
| TCP-1 fwnd with static bw allocation | — | 1 | 2 | 4 | 8 | ... |
| Extra (unused) BW | 0 | 7 | 6 | 4 | 0 | ... |
| TCP-1 fwnd with dynamic bw allocation | 16 | 15 | 14 | 12 | 8 | ... |

First we consider the algorithm operation. Initially there is only one TCP connection with a round-trip-time of 1 second. If the available capacity of the access segment 26 (see FIG. 5) is 16 packets/second then it is fully used by the first TCP connection since it is the only one. At the beginning of the second period another TCP connection arrives that has a round-trip-time of 1 second. According to the algorithm the available bandwidth is split among the first and second TCP connections with each connection getting 8 packets/second. However, the second TCP connection does not immediately start its share of 8 packets/second, because of the TCP slow start. The second TCP connection sends only 1, 2 and 4 packets in periods 2, 3, and 4 respectively before reaching the steady state rate of 8 packets/second. The static bandwidth allocation does not compensate for the TCP slow start mechanism. Thus, with static bandwidth allocation implemented using the algorithm there remains the unused bandwidths of 7, 6 and 4 packets in the periods 2, 3 and 4 respectively.

Considering the previous example, the first TCP connection will be allocated the unused bandwidth till the second TCP connection achieves a steady state. Therefore, the first TCP connection will send 15, 14 and 12 packets during the periods 2, 3 and 4 respectively. The second TCP connection reaches steady state in period 5, and then uses all of its allocated 8 packets and hence the first TCP connection also uses its allocated 8 packets.

Simulation of dynamic allocation of bandwidth using the bandwidth control 60 is shown. The network used to simulate the system is the same as shown in FIG. 5. Only the bandwidths for the non-realtime streams HTTP download 52 and FTP download 58 are shown, because the realtime stream shows the same performance as in case of static bandwidth allocation. Both static and dynamic bandwidth control ensure that the QoS requirements of the realtime streams are met. Dynamic bandwidth allocation improves the throughput, and hence performs better than the static bandwidth allocation.

In the simulation shown there is only one opportunity around 3 seconds for the dynamic allocation to take effect. The FTP download with dynamic allocation $58_a$ is already in steady state when the four connections, i.e., HTTP downloads $52_a$, $52_b$, $52_c$, $52_d$, for the HTTP download 52 are started. In case of the static bandwidth allocation as shown by the algorithm, the bandwidth control will immediately distribute the available bandwidth among all the active connections. But in the case of dynamic allocation, the fact that the recently initiated four HTTP connections would be in a slow start mode is used to allocate the unused bandwidth available during the slow start of the HTTP download to the FTP download, which is already in a steady state. The FTP download performance is improved as seen by the shifting of the FTP download with dynamic allocation $58_a$ to the right around 3 seconds. The can be compared in the graph to the plot for FTP download without dynamic allocation $58_b$. Therefore the dynamic allocation improves the utilization of the aggregate available bandwidth. The data rate for the FTP connections is gradually reduced to the steady state rate as the HTTP download 52 reaches the steady state. Preceding is the description of the dynamic bandwidth management. Below is the further description of the above referred bandwidth control 60.

The bandwidth control 60 (see FIG. 5) can be designed to work with a dynamic bandwidth allocation algorithm instead of the algorithm described above. The dynamic bandwidth allocation method achieves improved performance by allocating the unused bandwidth to the TCP connection that is already in steady state.

A particular application of the present invention is described in the context of a home network user. All above figures are used to provide context the description of the invention in context of the home user. The home network user is typically connected to the Internet through a home gateway, which is a specific type of gateway 28. The user is connected to the other services like video-on-demand and IP telephony through the same home gateway. The home network 30 (see FIG. 1) that connects to the home or residential gateway can be connected to a wide variety of devices like computers, televisions, telephones, radios etc.

The above described problems bandwidth management are present in the home user scenario, because it would be difficult to implement bandwidth management techniques at the Internet service provider end. The home user would normally not have any control over the Internet service provider's mechanism of implementing TCP connections. Hence, it becomes necessary to implement bandwidth management at the residential or home gateway.

The principle of the present invention is used to incorporate a bandwidth control 60 into the home gateway. The operation of the bandwidth control is described above in detail. Above description applies equally to a home network user. In particular, the home user will be typically sharing the communication channel of access segment 60 for both realtime and non-realtime TCP traffic as the home user may find it expensive to use dedicated channels for realtime datastreams. Hence, the invention is beneficial to the home user using a shared channel for accessing realtime and non-realtime data.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus for ensuring quality-of-service in a network, said apparatus comprising:
    at least one first stream sender having a Transmission Control Protocol (TCP) flow control window and operable to transmit a first stream therefrom downstream in accordance with a flow control window, wherein the flow control window specifies an amount of data which can be sent by said sender per acknowledgement received by said sender from a downstream recipient of said data;
    a network interconnection adapted to receive said first stream from said first stream sender and at least one second stream transmitted from a second stream sender; and
    a bandwidth control associated with said network interconnection and operable to adjust the flow control window of the first stream sender to meet a performance parameter associated with the second stream, wherein the bandwidth control dynamically allocates bandwidth by, in response to startup of the second stream, increasing the flow control window of the first stream that is in a steady state during a slow start period of the second stream.

2. The apparatus of claim 1 further comprising:
    a first network connection including said first stream sender; and
    a second network including said network interconnection.

3. The apparatus of claim 2 wherein said network interconnection being a home gateway and said second network being a home network.

4. The apparatus of claim 2 further comprising:
    at least one channel connecting said first stream sender and said second stream sender to said network interconnection, said channel having a bandwidth capacity shared by said first stream and said second stream.

5. The apparatus of claim 2 wherein said first stream being a non-realtime stream and said second stream being a realtime stream, said second stream consistently requiring a part of said bandwidth capacity.

6. The apparatus of claim 5 wherein said bandwidth control adjusting said flow control window so that said first stream using a share of said bandwidth capacity that is less than or equal to the difference between said bandwidth capacity and the bandwidth requirements of said second stream.

7. The apparatus of claim 1 wherein said performance parameter being selected from a set of predetermined quality-of-service parameters associated with said second stream.

8. The apparatus of claim 7 wherein said bandwidth control maintaining quality-of-service parameters for said second stream by adjusting said flow control window and controlling bandwidth requirements of said first stream.

9. The apparatus of claim 1 wherein said flow control window regulates the flow of said first stream.

10. The apparatus of claim 1 wherein said flow control window regulating the bandwidth usage of said first stream by regulating the flow of said first stream.

11. The apparatus of claim 1 wherein said network interconnection is a device chosen from a group consisting of routers, protocol converters and gateways.

12. An apparatus for ensuring quality-of-service in a network, said apparatus comprising:
one or more communication ports operatively connected to at least one of send or receive information via at least two TCP connections, each TCP connection supporting a TCP stream operating in accordance with Transmission Control Protocol (TCP) flow control windows, wherein the flow control windows specify amounts of data which can be sent by a sender per acknowledgement received by said sender from a downstream recipient of said data;
a network interconnection operatively connected to said one or more communication ports using a channel having a bandwidth capacity, wherein said one or more communication ports are further operatively connected to at least one of send or receive information via at least one realtime stream;
a bandwidth control associated with said network interconnection and operable to adjust the flow control windows of said at least two TCP connections for controlling bandwidth usage of said TCP stream, wherein the bandwidth control dynamically allocates bandwidth by, in response to startup of a new non-realtime stream, increasing a flow control window of a preexisting non-realtime stream that is in a steady state during a slow start period of the new non-realtime stream and decreasing the flow control window of the preexisting non-realtime stream when the new non-realtime stream achieves a steady state.

13. The apparatus of claim 12 further comprising:
at least one server operatively connected to send said TCP stream to said one or more ports via said TCP connections; and
at least one network element operatively connected to said network interconnection.

14. The apparatus of claim 13 wherein said at least one network element is included in a home network and said network interconnection is a home gateway.

15. The apparatus of claim 12 wherein said bandwidth control is operatively connected to fulfill a plurality of quality-of-service parameters for said at least one realtime stream by adjusting said flow control windows.

16. The apparatus of claim 15 wherein said bandwidth control is operatively connected to adjust said flow control windows so that said TCP streams require a share of said bandwidth capacity that is less than or equal to a difference between said bandwidth capacity and bandwidth requirements of said at least one realtime stream.

17. An apparatus for ensuring quality-of-service in a network, the apparatus comprising:
an edge router connecting to a communication channel;
a network interconnection connecting to said communication channel;
at least one realtime data stream being transmitted from said edge router to said network interconnection using said communication channel;
at least one TCP connection supporting a data stream transmitted over the communication channel in accordance with a Transmission Control Protocol (TCP) flow control window, wherein the flow control window specifies an amount of data which can be sent by a sender per acknowledgement received by said sender from a downstream recipient of said data; and
a bandwidth control associated with said network interconnection, said bandwidth control adjusting said flow control window for regulating the bandwidth requirements of said TCP connection by, in response to startup of a new data stream, increasing said flow control window of a preexisting data stream that is in a steady state during a slow start period of the new data stream.

18. The apparatus of claim 17 further comprising:
said bandwidth control adjusting said flow control window of said TCP connection for supporting at least one quality-of-service parameter associated with said realtime data stream.

19. The apparatus of claim 17 wherein said bandwidth control regulating the bandwidth requirements of said TCP connections by adjusting said flow control window so that said TCP streams require a share of said bandwidth capacity that is less than or equal to the difference between said bandwidth capacity and the bandwidth requirements of said realtime stream.

20. An apparatus for ensuring quality-of-service in a network by using dynamic bandwidth allocation, said apparatus comprising:
at least two first streams senders, each said first stream sender having at least one Transmission Control Protocol (TCP) flow control window and operable to transmit a first non-realtime data stream therefrom in accordance with the flow control window, wherein the flow control window specifies an amount of data which can be sent by one of said first stream senders per acknowledgement received by the one of said first stream senders from a downstream recipient of said data;
a network interconnection receiving said first streams from said first stream senders and at least one second non-realtime stream transmitted from a second stream sender; and
a bandwidth control associated with said network interconnection, wherein said bandwidth control dynamically adjusts bandwidth by, in response to startup of a second non-realtime stream, increasing a first flow control window of the first non-realtime stream when in a steady state and during a slow start period of the second non-realtime stream from the second stream sender.

21. A method for providing quality-of-service in a network, the method comprising:
regulating bandwidth requirements of at least one first stream by adjusting at least one Transmission Control Protocol (TCP) flow control window associated with at least one first stream sender, said at least one first stream sender transmitting said at least one first stream over a communication channel having a bandwidth capacity in accordance with Transmission Control Protocol, wherein the flow control window specifies an amount of data which can be sent by said at least one first stream sender per acknowledgement received by said at least one first stream sender from a downstream recipient of said data;

ensuring at least one quality-of-service parameter is met for at least one second stream transmitted from at least one second stream sender using said communication channel, said quality-of-service parameter being dependent on bandwidth requirements of said first stream;

using knowledge of bandwidth requirements of realtime and non-realtime streams to individually adjust flow control windows of the non-realtime streams in order to ensure that the non-realtime streams do not exceed bandwidth available for the non-realtime streams, thereby ensuring that the realtime streams are able to satisfy their required quality of service criteria; and dynamically allocating aggregate available bandwidth amongst non-realtime streams by, in response to startup, of a new, non-realtime stream, increasing a designated flow control window of a preexisting non-realtime stream that is already in a steady state during slow startup of the new, non-realtime stream, and then gradually reducing the designated flow control window of the preexisting non-realtime stream in the steady state to achieve a steady state rate as the new, non-realtime stream reaches the steady state.

22. The method of claim 21 wherein the step of regulating further comprising:

adjusting bandwidth requirements of said first stream using a bandwidth control associated with a network interconnection connected to said communication channel.

23. The method of claim 22 wherein the step of regulating further comprising:

adjusting bandwidth requirements of said first stream so that a bandwidth requirement of said first stream is less then or equal to the difference between the bandwidth capacity of said communication channel and bandwidth requirement of said second stream.

24. The method of claim 21 wherein the bandwidth capacity of said communication channel shared by said first stream and said second stream.

25. The method of claim 21 wherein said flow control window regulating the bandwidth requirement of said first stream.

26. The method of claim 21 wherein said network interconnection is a device chosen from a group consisting of routers, protocol converters and gateways.

27. The method of claim 21 wherein said first stream comprises a non-realtime stream and said second stream comprises a realtime stream.

28. The method of claim 27 wherein said non-realtime stream comprises a TCP stream and said first stream sender is a TCP connection.

29. A method for ensuring quality-of-service in a network by using dynamic bandwidth allocation, the method comprising the steps of:

adjusting dynamically at least one Transmission Control Protocol (TCP) flow control window associated with a first stream sender, said first stream sender transmitting at least one first stream using at least one communication channel having a bandwidth capacity in accordance with Transmission Control Protocol, wherein the flow control window specifies an amount of data which can be sent by said first stream sender per acknowledgement received by said first stream sender from a downstream recipient of said data;

regulating bandwidth requirements of said first stream by dynamically adjusting said flow control window; and ensuring at least one quality-of-service parameter is met for at least one second stream transmitted from at least one second stream sender using said communication channel, said quality-of-service parameter being dependent on a bandwidth requirement of said first stream;

using knowledge of bandwidth requirements of realtime and non-realtime streams to individually adjust flow control windows of the non-realtime streams in order to ensure that the non-realtime streams do not exceed bandwidth available for the non-realtime streams, thereby ensuring that the realtime streams are able to satisfy their required QoS criteria; and dynamically allocating aggregate available bandwidth amongst non-realtime streams by, in response to startup of a new, non-realtime stream, increasing a designated flow control window of a preexisting non-realtime stream that is already in a steady state during slow startup of the new, non-realtime stream, and then gradually reducing the designated flow control window of the preexisting non-realtime stream in the steady state to achieve a steady state rate as the new, non-realtime stream reaches the steady state.

30. The method of claim 29 wherein the bandwidth capacity of said communication channel is shared between said first stream and said second stream.

31. The method of claim 29 wherein said step of adjusting further comprising:

allocating unused bandwidth assigned to a given said first stream to an another said first stream by using a bandwidth control associated with a network interconnection connected to said first stream sender and said second stream sender.

32. The method of claim 31 wherein said bandwidth control allocating equal bandwidth to said given first stream and said another first stream upon said given first stream achieving a steady state.

33. The method of claim 29 wherein said first stream comprises a non-realtime TCP stream and said second stream comprises a realtime stream.

34. The apparatus of claim 1 wherein the bandwidth control dynamically allocates bandwidth by decreasing the flow control window of the first data stream when the second data stream achieves a steady state.

35. The apparatus of claim 17 wherein the bandwidth control dynamically allocates bandwidth by decreasing the flow control window of the preexisting data stream when the new data stream achieves a steady state.

36. The method of claim 21 further comprising controlling flow control windows of multiple streams at the network interconnection directly in response to aggregate available bandwidth reserved for only non-real time streams at the network interconnection.

* * * * *